United States Patent
Yamaoka et al.

(10) Patent No.: US 8,351,312 B2
(45) Date of Patent: Jan. 8, 2013

(54) OPTICAL DISC RECORDING APPARATUS, OPTICAL DISC RECORDING CIRCUIT AND OPTICAL DISC

(75) Inventors: Masaru Yamaoka, Osaka (JP); Yuji Takagi, Osaka (JP); Takeharu Yamamoto, Osaka (JP); Makoto Usui, Osaka (JP)

(73) Assignee: Panasonic Corporation, Osaka (JP)

( * ) Notice: Subject to any disclaimer, the term of this patent is extended or adjusted under 35 U.S.C. 154(b) by 594 days.

(21) Appl. No.: 12/599,118

(22) PCT Filed: Mar. 4, 2009

(86) PCT No.: PCT/JP2009/000967
§ 371 (c)(1),
(2), (4) Date: Nov. 6, 2009

(87) PCT Pub. No.: WO2009/113271
PCT Pub. Date: Sep. 17, 2009

(65) Prior Publication Data
US 2011/0007616 A1    Jan. 13, 2011

(30) Foreign Application Priority Data
Mar. 12, 2008 (JP) .................................. 2008-062187

(51) Int. Cl.
*G11B 20/10* (2006.01)
*G11B 7/26* (2006.01)
(52) U.S. Cl. ............... 369/47.51; 369/272.1; 369/44.26; 369/275.4; 369/59.25; 369/275.3
(58) Field of Classification Search .................. 264/447
See application file for complete search history.

(56) References Cited

U.S. PATENT DOCUMENTS
6,735,160 B1 * 5/2004 Miyashita et al. ......... 369/59.12
(Continued)

FOREIGN PATENT DOCUMENTS
JP    2903422    3/1999
(Continued)

OTHER PUBLICATIONS

International Search Report issued Jun. 2, 2009 in International (PCT) Application No. PCT/JP2009/000967.
Supplementary European Search Report issued May 11, 2011 in European Application No. EP 09 72 0109.

*Primary Examiner* — Wayne Young
*Assistant Examiner* — Dionne Pendleton
(74) *Attorney, Agent, or Firm* — Wenderoth, Lind & Ponack, L.L.P.

(57) ABSTRACT

An optical disc recording apparatus (10) is provided with a tracking servo (13) for tracking a spiral track of concave and convex marks, an analog signal processor (14) for extracting a reproduction signal corresponding to the concave and convex marks, a digital signal processor (15) for extracting a channel clock synchronized with a channel bit length of the concave and convex marks, and a sub-information recording section (30) for recording sub-information by irradiating laser light based on the tracking to the spiral track. The sub-information recording section (30) records all the sub-information by repeating a process of recording a part of the sub-information by discretely irradiating laser light at a specified interval and with a specified frequency in synchronism with a channel clock by one tracking to form recordable marks on a reflective film a plurality of times. By this construction, a tracking control to the concave and convex marks can be stably executed and the sub-information can be stably recorded.

8 Claims, 6 Drawing Sheets

U.S. PATENT DOCUMENTS

| | | |
|---|---|---|
| 7,236,439 B2 | 6/2007 | Usui et al. |
| 7,240,221 B2 | 7/2007 | Sako et al. |
| 2003/0137911 A1* | 7/2003 | Nakao et al. ............... 369/47.22 |
| 2003/0152009 A1 | 8/2003 | Usui et al. |
| 2003/0174605 A1 | 9/2003 | Sako et al. |
| 2005/0243691 A1 | 11/2005 | Usui et al. |
| 2007/0097849 A1* | 5/2007 | Sakamoto et al. ............ 369/288 |
| 2009/0097376 A1 | 4/2009 | Yamaoka et al. |
| 2009/0196140 A1 | 8/2009 | Yamaoka et al. |

FOREIGN PATENT DOCUMENTS

| | | |
|---|---|---|
| WO | 02/101733 | 12/2002 |
| WO | 03/003358 | 1/2003 |
| WO | 2007/123083 | 11/2007 |
| WO | 2007/139077 | 12/2007 |

* cited by examiner

OPTICAL DISC RECORDING APPARATUS, OPTICAL DISC RECORDING CIRCUIT AND OPTICAL DISC

FIELD OF THE INVENTION

The present invention relates to an optical disc and an optical disc recording apparatus and an optical disc recording circuit for recording information on the optical disc and, for example, relates to CD, DVD and Blu-ray disc media and an optical disc recording apparatus for recording information on these optical discs. The present invention also relates to technology for forming an optical disc by depositing a reflective film whose reflectance changes upon the irradiation of laser light after copying concave and convex recording marks representing main information on an optical disc substrate by a stamper and recording sub-information representing disc specific information and the like in a superimposition manner after the optical disc is formed. The present invention further relates to technology for recording sub-information difficult to fraudulently copy without degrading accuracy in reading main information.

BACKGROUND ART

Optical discs are widely used as inexpensive digital information recording media. For example, Blu-ray discs have a capacity of 25 gigabytes when including a single layer and 50 gigabytes when including two layers and can record a high-vision video content of good quality for about 2 to 4.5 hours. Accordingly, as the capacity of an optical disc increases, the value of a digital video content recorded in one optical disc increases and, hence, the protection of the copyright of a digital content to be recorded has become an absolutely critical technological problem.

However, nowadays, there is an overflow of fraudulent copies of digital contents from optical discs and illegal optical disc manufacturers such as pirate manufacturers. This leads to such a situation where the sound distribution of digital copyrighted works is hindered and no proper profit sharing is made to copyright holders.

Accordingly, for example, patent literature 1 discloses an information recording/reproducing method for irradiating laser light, whose recording state is on/off controlled by a second signal in a lower band than a first signal, two or more times to the same information track on a recording medium already recorded with the first signal while positions on the recording medium are synchronized, thereby recording the second signal in such a superimposition manner as to further change an optical change in a part irradiated with the laser light, and separating and reproducing the second signal at the time of reproduction.

According to patent literature 1, by recording the second signal on the information track recorded with the first signal in a superimposition manner, the management of the information track on the recording medium is realized without validating/invalidating the information on the information track recorded with the second signal or providing a special information track as a substitute for the information track to manage the position of the information track.

However, in the invention disclosed in patent literature 1, the second signal is recorded on the part pre-recorded with the first signal in a superimposition manner a plurality of times and superimposed recording is repeated until the second signal can be normally read. Accordingly, accuracy in reading the pre-recorded first signal deteriorates and a defect margin relievable by an error correction or the like deteriorates. Further, since laser irradiation to the same region is repeated two or more times to enable the normal readout of the second signal, a recording time is excessively long. It is also known in ordinary optical disc recording apparatuses that a tracking operation becomes unstable if laser of a recording power level is irradiated during a tracking control to concave and convex recording marks of a ROM disc such as a DVD-ROM. This is because a tracking method to a track groove in a recordable optical disc and a tracking method to concave and convex recording marks of a ROM disc normally differ.

A method for stably recording sub-information in the case where laser light of a recording power level is irradiated while a tracking control is executed to concave and convex recording marks of a general ROM disc formed with no tracking groove has not yet been disclosed up to now.

Patent Literature 1: Publication of Japanese Patent No. 2903422

DISCLOSURE OF THE INVENTION

An object of the present invention is to provide an optical disc recording apparatus, an optical disc recording circuit and an optical disc enabling stable a tracking control to concave and convex marks and stable recording of sub-information.

One aspect of the present invention is directed to an optical disc recording apparatus for recording sub-information used to reproduce main information on an optical disc including concave and convex marks formed along a spiral track based on the main information and a reflective film which is formed on the concave and convex marks and whose reflectance changes upon laser light irradiation, comprising an optical head for irradiating laser light to the optical disc; a tracking section for tracking the spiral track of the concave and convex marks; a reproduction signal extracting section for irradiating laser light with a first laser power to the concave and convex marks to thereby extract a reproduction signal corresponding to the concave and convex marks from reflected light; a clock extracting section for extracting a channel clock synchronized with a channel bit length of the concave and convex marks from the reproduction signal extracted by the reproduction signal extracting section; and a sub-information recording section for recording the sub-information by irradiating laser light with a second laser power different from the first laser power based on the tracking to the spiral track by the tracking section, wherein the sub-information recording section repeats a process of recording a part of the sub-information by discretely irradiating the laser light of the second laser power at a specified interval and with a specified frequency in synchronism with the channel clock extracted by the clock extracting section by one tracking by the tracking section to form recordable marks on the reflective film a plurality of times, thereby recording all the sub-information.

According to this construction, the laser light is irradiated to the optical disc including the concave and convex marks formed along the spiral track based on the main information and the reflective film which is formed on the concave and convex marks and whose reflectance changes upon the laser light irradiation. The spiral track of the concave and convex marks is tracked and the laser light is irradiated with the first laser power to the concave and convex marks, whereby the reproduction signal corresponding to the concave and convex marks is extracted from the reflected light. The channel clock synchronized with the channel bit length of the concave and convex marks is extracted from the extracted reproduction signal, and the sub-information is recorded by the irradiation of the laser light with the second laser power different from the first laser power based on the tracking to the spiral track.

In one tracking, the laser light of the second laser power is discretely irradiated at the specified interval and with the specified frequency in synchronism with the extracted channel clock to form the recordable mark on the reflective film, whereby a part of the sub-information is recorded. By repeating the process of recording a part of the sub-information by one tracking a plurality of times, all the sub-information is recorded.

Accordingly, all the sub-information is not recorded by one tracking, but all the sub-information is recorded by repeating the process of recording a part of the sub-information by discretely irradiating the laser light of the second laser power by one tracking a plurality of times. Thus, even if the recordable marks are formed with the second laser power while the concave and convex marks are reproduced with the first laser power, a tracking control to the concave and convex marks can be stably executed and the sub-information can be stably recorded.

The object, features and advantages of the present invention will become more apparent upon the reading of the following detailed description with reference to accompanying drawings.

BEST MODES FOR EMBODYING THE INVENTION

Hereinafter, embodiments of the present invention are described with reference to the accompanying drawings. It should be appreciated that the following embodiments are specific examples of the present invention and not of the nature to limit the technical scope of the present invention.

First Embodiment

In a first embodiment is described an optical disc according to one embodiment of the present invention.

In this embodiment, after main information is recorded by forming concave and convex recording marks in an optical disc master and the concave and convex recording marks are transferred to an optical disc substrate made of a resin material such as polycarbonate, a reflective film whose reflectance changes upon the irradiation of laser light is deposited on the optical disc substrate having the concave and convex recording marks transferred thereto and a protection film is added on the reflective film, whereby an optical disc is formed. Laser light is irradiated to the formed optical disc to change the reflectance of the reflective film on the concave and convex recording marks and form recordable marks, whereby sub-information is recorded. A detailed construction of the above optical disc is described below.

Figure 1:
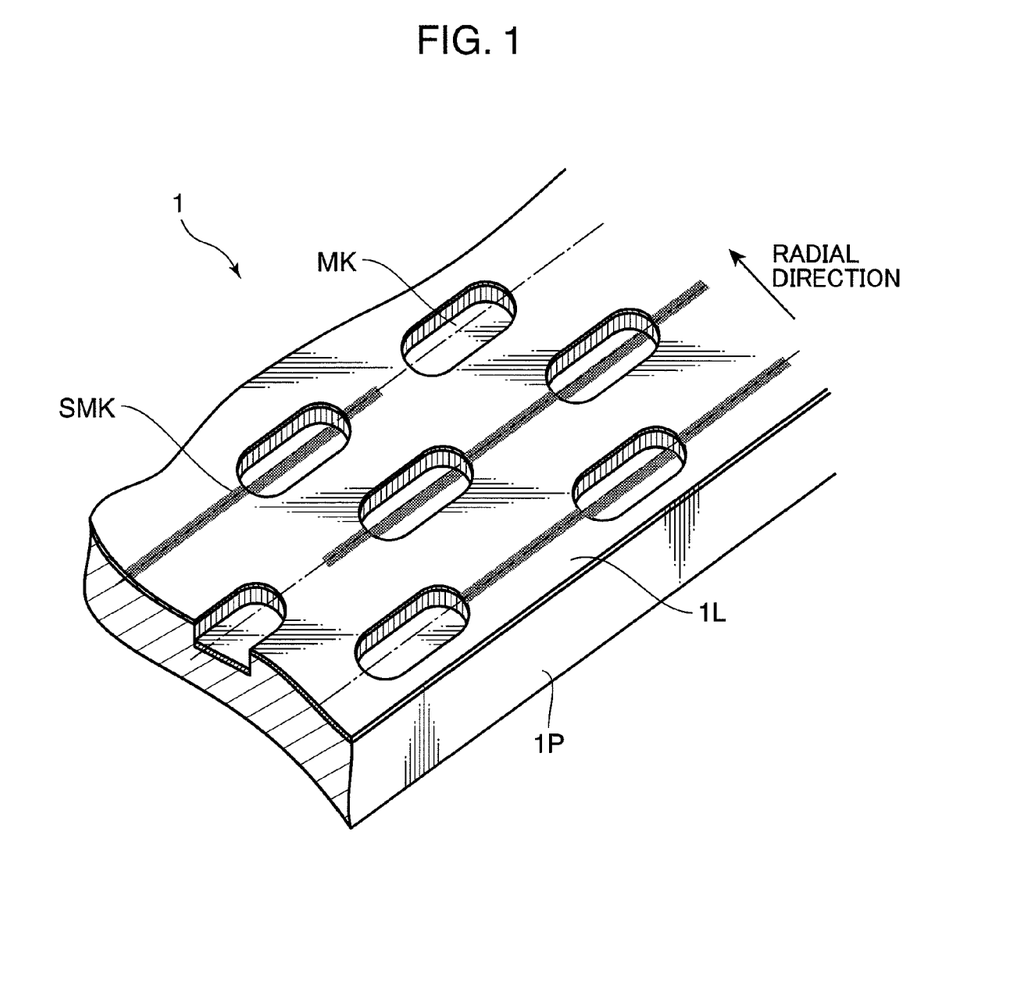
FIG. 1 is a conceptual diagram showing the structure of an optical disc according to one embodiment.

FIG. 1 is a conceptual diagram showing the structure of the optical disc according to this embodiment.

An optical disc 1 of this embodiment is comprised of an optical disc substrate 1P having concave and convex recording marks MK transferred form the optical disc master, the concave and convex recording marks MK recorded with main information such as content information, a reflective film 1L whose reflectance changes upon laser irradiation and recordable marks SMK recorded with sub-information by changing the reflectance of the reflective film 1L by laser irradiation after the optical disc is formed.

The optical disc substrate 1P is made of a polycarbonate resin or the like and has the concave and convex recording marks MK transferred thereto from the optical disc master.

The concave and convex recording marks MK are transferred from the optical disc master and content information to be recorded on the optical disc and management information representing recorded positions of the content information, physical properties and the like are mainly recorded as main information. The concave and convex recording marks MK are formed similar to those of DVD-ROMs and Blu-ray ROMs as ordinary reproduction-only media, and the main information modulated using an 8-16 modulation method, a 17pp modulation method or the like is recorded thereby.

The reflective film 1L is deposited on the optical disc substrate 1P having the concave and convex recording marks transferred thereto and the reflectance thereof changes upon the irradiation of laser light having a specified intensity or higher. Further, the reflective film 1L includes a write-once film whose reflectance irreversibly changes upon the irradiation of laser light having a specified intensity or higher. In ordinary reproduction-only media, reflective films made of aluminum or silver are used. Further, an LtoH (Low to High) film whose reflectance changes upon the irradiation of laser light having a specified intensity or higher is preferably used as the write-once film. This is because the reflectance decreases upon the irradiation of laser light having a specified intensity or higher in metallic reflective films of ordinary reproduction-only media. Accordingly, by intentionally using the LtoH film, it becomes difficult to copy recordable marks recorded by increasing the reflectance to ordinary reproduction-only media. Therefore, resistance to fraudulent copying is dramatically increased in the case of recording copyright protection information or the like using recordable marks.

The optical disc 1 is formed by depositing the reflective film 1L after the concave and convex recording marks MK are transferred to the optical disc substrate 1P and adding the protection film. The recordable marks SMK are formed by executing a tracking control to the concave and convex recording marks MK and irradiating laser light to concave and convex recording mark track substantially from right above to increase the reflectance of the reflective film 1L including the LtoH film after the optical disc is formed. The sub-information is recorded by the recordable marks SMK.

The sub-information includes, for example, copyright protection information such as key information used to break a code of the content information (main information) recorded by the concave and convex recording marks MK. Accordingly, the encrypted content information cannot be reproduced unless the sub-information can be reproduced. Since the sub-information is normally recorded in uncopiable format by the recordable marks, it also has an effect of preventing fraudulent copying. Further, the sub-information may also be identification information unique to each optical disc and adapted to identify the optical disc.

The recordable marks SMK of this embodiment are recorded in synchronism with a data format of the concave and convex recording marks MK by executing the tracking control to the concave and convex recording marks. Thus, the recordable marks SMK can be detected in synchronism with synchronization codes of the concave and convex recording marks MK, wherefore it becomes unnecessary to possess synchronization codes unique to the recordable marks SMK and there is a merit of being able to simultaneously reproduce the concave and convex recording marks MK and the recordable marks SMK.

However, not laser light of a reproduction intensity, but the one of a recording intensity needs to be irradiated in order to form the recordable marks SMK. Accordingly, the recordable marks SMK are recorded while the irradiation of the laser light of the recording intensity and that of the laser light of the reproduction intensity are repeated. Even during the recording of the recordable marks SMK, it is necessary to stably execute the tracking control to the concave and convex recording marks MK and stably reproduce the concave and convex recording marks MK for synchronous recording on the concave and convex recording marks. Normally, if laser light of the recording level is irradiated for a long time or highly frequently, the level of reflected light from the concave and convex recording marks MK is not stabilized, thereby causing a problem that the tracking control to the concave and convex recording marks MK and the reproduction of the concave and convex recording marks MK become unstable.

Accordingly, in this embodiment, some sub-information bits are recorded by discretely irradiating laser light in a specified range (e.g. by the frame or by the sector) of the data structure of the concave and convex recording marks MK by one tracking scan and all the sub-information bits are recorded by performing a plurality of tracking scans in the same region. In this way, it is not necessary to irradiate the laser light of the recording intensity for a long time or frequently and it becomes possible to stably execute the tracking control to the concave and convex recording mark track and a reproduction control of the concave and convex recording marks MK and simultaneously stably record the sub-information by the irradiation of the laser light of the recording intensity.

Laser light normally has a temperature characteristic and a voltage characteristic and, even if laser light intensity is set, there is a problem that an actual laser light intensity deviates from the set laser light intensity. If the laser light intensity deviates, it becomes impossible to stably record the sub-information. Accordingly, in this embodiment, trial light emissions (test light emissions) are performed at several patterns of laser light intensities immediately before the sub-information is recorded and the laser light intensity is corrected by directly extracting it from laser irradiation light. These trial light emissions are also performed in synchronism with the concave and convex recording mark data format by executing the tracking control to the concave and convex recording marks. Thus, the trial light emissions are discretely performed in a specified data range of the concave and convex recording marks MK as at the time of recording the sub-information.

Figure 2:
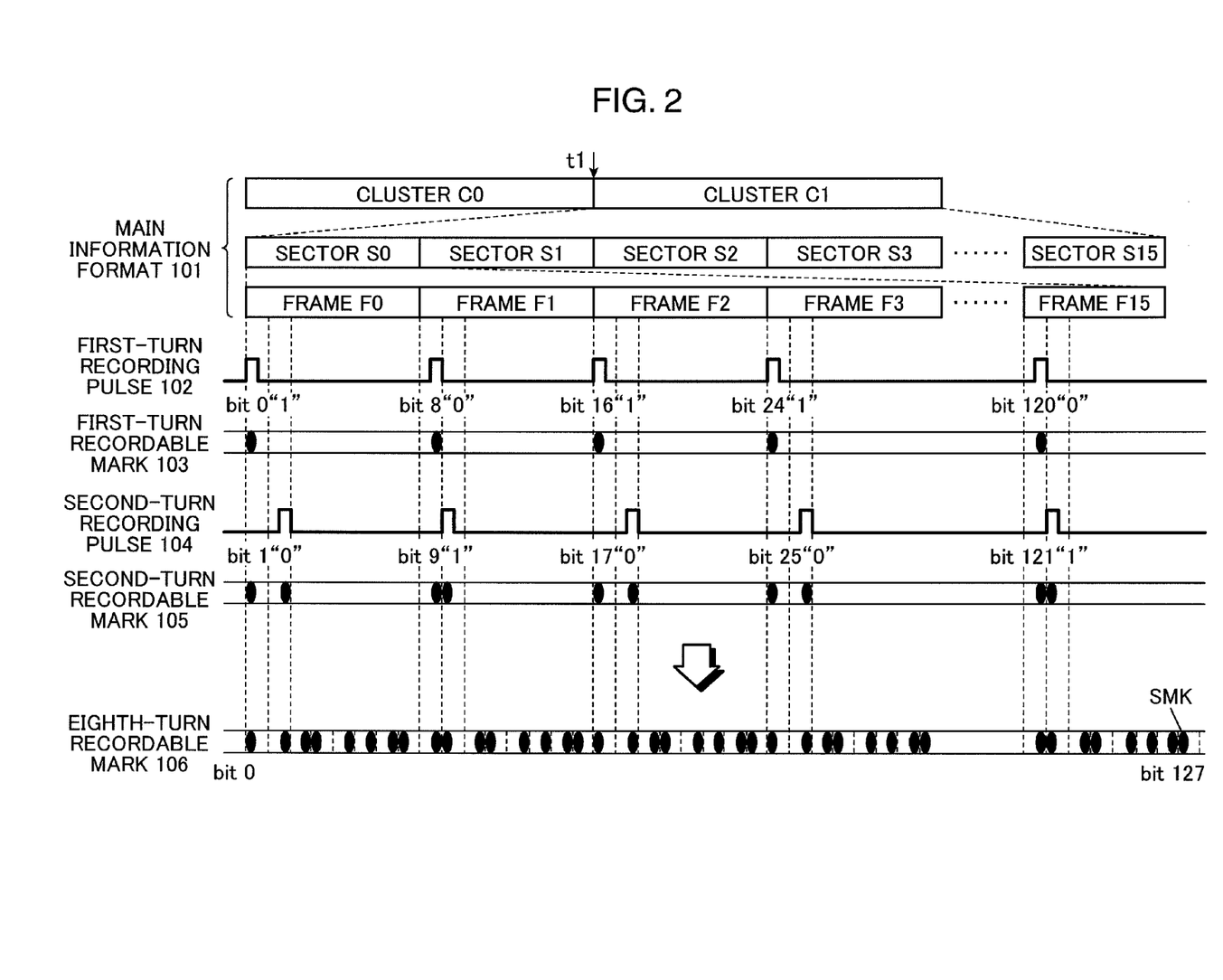
FIG. 2 is a timing chart showing a recording format of recordable marks of the optical disc of the embodiment.

FIG. 2 is a timing chart showing a recording format of the recordable marks of the optical disc of this embodiment.

It is described to record the sub-information from the starting position (timing t1) of a cluster C1 on the optical disc of this embodiment. Normally, the set laser light intensity changes due to a temperature change or the like in the optical disc recording apparatus. Accordingly, laser light is irradiated beforehand (trial light emission) at a plurality of laser light intensities in a region immediately before the region where the sub-information is to be recorded (e.g. cluster C0 immediately before the cluster C1). The actual intensity of laser light irradiated at each laser light intensity is measured and an optimal laser light intensity upon recording the sub-information is selected and set immediately before the sub-information is recorded. In this way, even if the laser light intensity changes due to a temperature change or the like, the sub-information can be stably recorded since the laser light intensity for recording the sub-information is observed and set immediately before the sub-information is recorded.

In FIG. 2, a main information format 101 indicates the format of the cluster C0 as a section for confirming the laser light intensity by the trial light emissions and setting the laser light intensity and the cluster C1 continuous with the cluster C0 in a circumferential track direction. The main information is made up of a plurality of clusters, but only two clusters C0, C1 are shown in FIG. 2. In this embodiment, the sub-information is recorded by laser light irradiation from the starting position (timing t1) of the cluster C1. Each of the clusters C1, C0 is made up of sixteen sectors S0 to S15, and each sector is made up of sixteen frames F0 to F15. The trial light emission is performed in the cluster C0 while the laser light intensity is changed, and the laser light intensity optimal for the recording of the sub-information is selected. Then, the recording of the sub-information is started from the starting position (timing t1) of the cluster C1

In FIG. 2, a recording pulse 102 indicates a sub-information recording pulse by the first (first-turn) tracking scan. The sub-information is recorded in a 128-bit section for each frame by PE-modulating one sub-information bit. Thus, in the first tracking scan, the sub-information is recorded in the 128-bit section at the leading end of the each frame. In this embodiment, the $0^{th}$ sub-information (bit0) is recorded in the frame F0 of the cluster C1, the $8^{th}$ sub-information (bit8) in the frame F1, the $16^{th}$ sub-information (bit16) in the frame F2, the $24^{th}$ sub-information (bit24) in the frame F3, . . . , and the $120^{th}$ sub-information (bit120) in the frame F15.

The sub-information is recorded while being PE-modulated. In other words, in the case of recording "1" as the sub-information as in the bit0, the laser light of the recording intensity is irradiated in a section of the first 64 channel bits of the 128-channel bit section as a sub-information bit recording region. In this way, "1" is recorded as the sub-information bit. On the other hand, in the case of recording "0" as the sub-information as in bit8, the laser light of the recording intensity is irradiated in a section of the last 64 channel bits of the 128-channel bit section contrary to the bit0.

In FIG. 2, a recordable mark 103 indicates a state where the sub-information is recorded by the recording pulse 102 of FIG. 2. The LtoH recording film (reflective film) is deposited on the concave and convex recording marks on this optical disc. Thus, the recordable marks with increased reflectance are formed only in the sections irradiated with the laser light of a recording level according to the irradiation of the laser light of the recording level. In this way, the sub-information is recorded. Further, similar to the trial light emission, the sub-information is recorded bit by bit in the 128-channel bit section in the frame by a plurality of laps of tracking scans. Since the sub-information of 8 bits is recorded in one frame, the sub-information of all the bits is recorded by going around the same track eight times.

In FIG. 2, a recording pulse 104 indicates a sub-information recording pulse by the second (second-turn) tracking scan. After the sub-information is recorded in the first 128- channel bit sections of the respective frames by the first tracking scan, the second tracking scan is performed to the same track, whereby the sub-information is recorded in a 128-bit section continuous with and adjacent to the sub-information recorded by the first tracking scan. The sub-information bit1, bit9, bit17, bit 25, ..., bit121 is recorded while being PE-modulated in the 128-channel bit sections adjacent to the sub-information bit0, bit8, bit16, bit24, ..., bit120 in the first 128-channel bit sections of the respective frames recorded by the first tracking scan.

In FIG. 2, a recordable mark 105 indicates a state where the sub-information is recorded by the recording pulse 104 of the second tracking scan of FIG. 2. As described for the recording pulse 104 of FIG. 2, the sub-information bit1, bit9, bit17, bit 25, ..., bit121 is recorded while being PE-modulated in the 128-channel bit sections continuous with and adjacent to the sub-information recorded by the first tracking scan.

In FIG. 2, a recordable mark 106 indicates a state where all the bits of the sub-information are recorded by the eighth tracking scan. In this embodiment, the sub-information of 128 bits (bit0 to bit127) is repeatedly recorded in each sector.

In this embodiment, upon the first tracking scan, the optimal laser light intensity for recording the sub-information is set by performing the trial light emission in the cluster C0. Thereafter, one bit of the sub-information is successively recorded in each frame from the leading end (timing t1) of the cluster C1 as a sub-information recording starting position, and all the bits of the sub-information are recorded through the eight tracking scans performed to the same track.

The sub-information of this optical disc needs not include specific synchronization codes since being recorded in synchronism with the concave and convex recording marks, but the laser light of the recording level needs to be irradiated while the concave and convex recording marks are reproduced. Normally, in the case of irradiating the laser light of the recording level during the reproduction, a tracking operation and an operation of reproducing the concave and convex recording marks become unstable. This is because reflected light exceeding a level assumed for the reproducing operation returns due to the irradiation of the laser light of the recording level.

On the other hand, an ordinary recording/reproduction drive needs to guarantee a stable reproducing operation even if there are fingerprints, dust and scratches on an optical disc. In the presence of fingerprints, dust and scratches, a burst error is judged and a tracking servo in a problematic section is held or a clock frequency of a PLL clock obtained by reproducing the concave and convex recording marks is held.

Thus, the sub-information can be recorded on this optical disc while the concave and convex recording marks are reproduced by irradiating the laser light of the recording level in such a range and with such a frequency that the drive permits as a burst error. Although the sub-information is recorded in the 128-channel bit sections and with the frame-by-frame frequency in this embodiment, the range and frequency of the irradiation of the laser light of the recording level do not matter if such range and frequency are equal to or below burst error permissible range (burst error length) and allowable frequency (burst error frequency) of the drive.

Specifically, a specified interval of the irradiation of the laser light of the recording level is equal to or shorter than the burst error length at which the reproduction of the main information recorded by the concave and convex recording marks on the optical disc is permissible. A specified frequency of the irradiation of the laser light of the recording level is equal to or lower than the burst error frequency with which the reproduction of the main information recorded by the concave and convex recording marks on the optical disc is permissible.

Further, the main information is made up of a plurality of frames accompanied by synchronization codes and satisfies an equation of $Lw=Lf/(2\times M)$ (where M is a natural number) when Lf denotes the length of the frames and Lw denotes a specified interval of the irradiation of the laser light of the recording level. Further, the specified frequency of the irradiation of the laser light of the recording level is a frequency synchronized with the frames.

In order to stably control the tracking servo, a section where a tracking error signal is not input to the tracking servo is preferably equal to or below $Tp/2\pi S$ with respect to a rotation period T of the optical disc, where Tp denotes a track pitch and S denotes a maximum eccentricity. Accordingly, a period of the irradiation of the laser light of the recording level is preferably equal to or shorter than $Tp/2\pi S$ with respect to the rotation period T and, likewise, preferably equal to or shorter than $Tp/2\pi S$ with respect to a circumference L where the tracking control is performed. Therefore, the length in a circumferential direction of the recordable marks for the sub-information is preferably equal to or shorter than $L\times Tp/2\pi S$.

Figure 3:
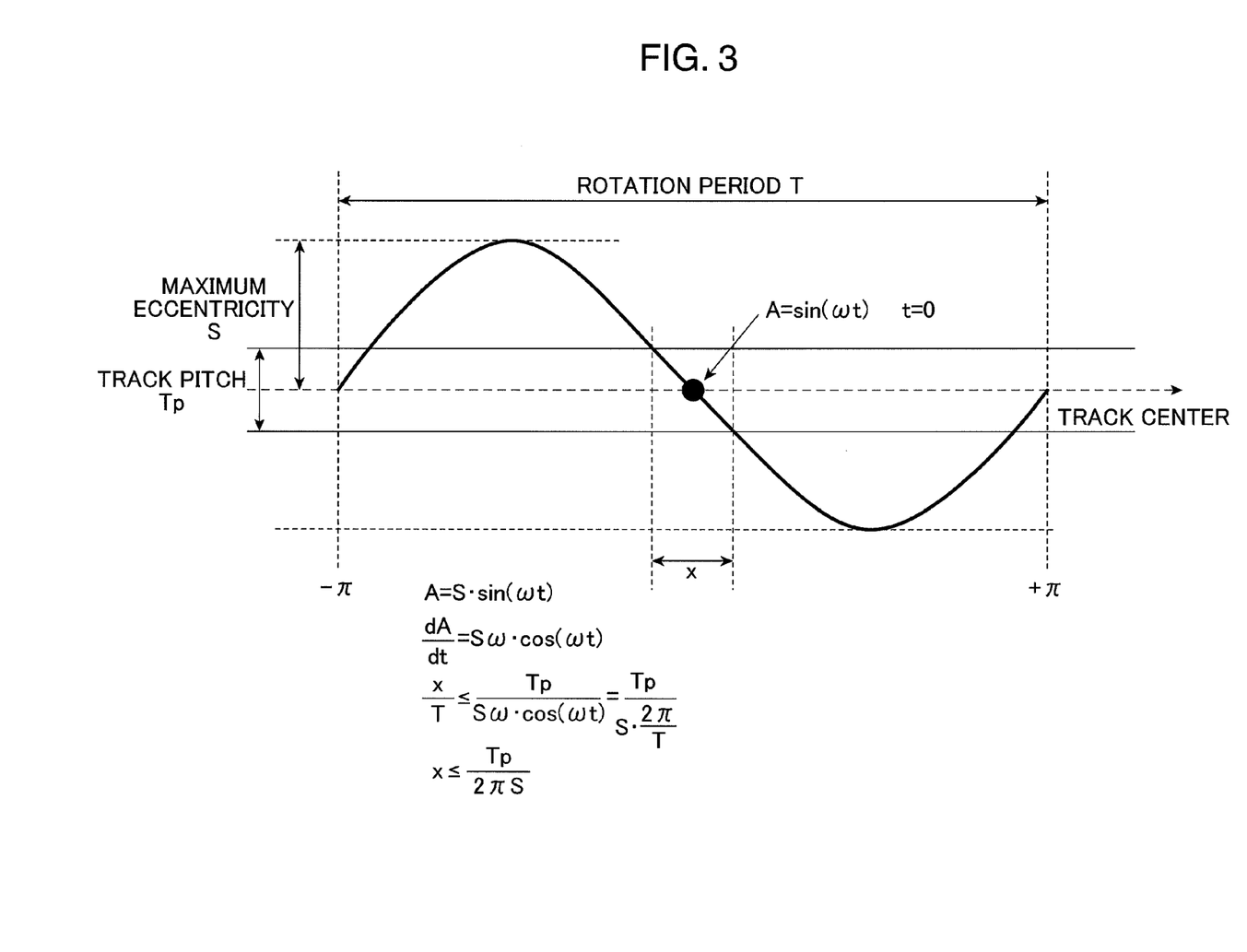
FIG. 3 is a conceptual diagram showing a reason why it is preferable to set an irradiation period of recording-level laser light equal to or shorter than $Tp/2\pi S$.

FIG. 3 is a conceptual diagram showing a reason why it is preferable to set the irradiation period of the laser light of the recording level equal to or shorter than $Tp/2\pi S$.

The stability of the tracking servo is determined by the maximum eccentricity S and the track pitch Tp of the optical disc. Specifically, the stability of the tracking servo is determined by a permissible range x where a point of maximum speed A, which crosses a track of the track pitch Tp due to eccentricity, does not cross the track in the case where a tracking error signal cannot be sampled even once.

Here, if T, S and Tp denote the rotation period, the maximum eccentricity and the track pitch, the permissible range x where the track is crossed due to eccentricity can be calculated to be equal to or below $Tp/2\pi S$. Accordingly, if a case is thought where the tracking error signal cannot be sampled even once in a worst condition although the laser light of the recording level is irradiated, the irradiation period of the laser light of the recording level is equal to or shorter than $T\times Tp/2\pi S$ if T denotes the rotation period. Thus, the length of the recordable mark of the sub-information, which is formed by such laser light irradiation, in the circumferential direction is preferably set equal to or shorter than $L\times Tp/2\pi S$ if L denotes the circumference of the region where the sub-information is recorded and preferably set equal to or below $CB\times Tp/2\pi S$ if CB denotes the total channel bit number on the circumference of the region where the sub-information is recorded.

By forming the recordable marks as above, there is no likelihood of erroneously crossing the track of the optical disc having the track pitch Tp with the maximum eccentricity S and the sub-information can be stably recorded even if a tracking error signal of the phase difference method cannot be sampled by irradiating laser light of the recording level.

If the optical disc of this embodiment is a Blu-ray disc, a maximum period of the irradiation of the laser light of the recording level is 40 μs (microseconds), the length of the maximum recordable mark in the circumferential direction is 0.2 mm (millimeters) and there are 2600 channel bits. Since the minimum unit frame length accompanied by the synchronization code is 1932 channel bits in the Blu-ray disc, there is no problem if the lengths in the circumferential direction of the recordable marks for recording the sub-information are set equal to or shorter than one frame.

The maximum eccentricity S is normally restricted by the physical specifications of each disc. In the case of Blue-ray discs, the maximum eccentricity S is 37.5 μm.

In the case of irradiating the laser light of the recording level, there is a possibility that the main information recorded by the concave and convex recording marks cannot be read. Accordingly, the period and interval of the irradiation of the laser light at the recording level are set equal to or shorter than the burst error length specified from an error correction format of each disc. Thus, even if the signals of the concave and convex recording marks cannot be read at all upon the irradiation of the laser light of the recording level, an error correction is possible and the main information can be stably read. Further, if the error correction format of the optical disc is determined, an allowable frequency of burst errors can be known and it is preferable to irradiate the laser light of the recording level in one tracking operation with this burst error allowable frequency or lower.

When T, Tp and S denote the rotation period of the optical disc in the circumferential direction, the track pitch and the maximum eccentricity in this way, the specified interval of the irradiation of the laser light of the recording level is equal to or shorter than T×Tp/2πS. Further, the specified interval of the irradiation of the laser light of the recording level is equal to or shorter than one frame.

As described above, in the optical disc of this embodiment, the concave and convex recording marks are transferred to the disc substrate by transferring the concave and convex recording marks formed on the optical disc master to the disc substrate based on a signal having the content thereof modulated similar to the formation of an ordinary ROM disc. Although an ordinary ROM disc is formed by depositing a metal film of silver or aluminum after the concave and convex recording marks are transferred, the optical disc of this embodiment is characterized by using a write-once film which is normally used on a write-once disc and whose reflectance changes upon laser light irradiation.

After the optical disc is formed, the recordable marks where the reflectance of the write-once film is changed are formed to record the sub-information by irradiating the laser light of the recording level while tracking is performed to the concave and convex recording mark track and the concave and convex recording marks are reproduced. In order to stably set the laser light intensity of the recording level for forming the recordable marks, the trial light emissions are performed stepwise in the specified section of the data format of the concave and convex recording marks in synchronism with the concave and convex recording marks in the cluster immediately before the one where the sub-information is to be recorded, whereby the optimal laser light intensity of the recording level is set.

However, in an ordinary optical disc drive, reflected light intensity from the disc increases and no stable tracking scan can be performed to the concave and convex recording marks upon recording-level light irradiation. Accordingly, on the optical disc of this embodiment, the laser light irradiation for recording the sub-information and the trial light emissions necessary to record the sub-information are performed over a plurality of tracking scans. Further, at the time of recording the sub-information or performing the trial light emissions, the recordable marks are recorded by irradiating the laser light of the recording level in such a range and with such a frequency that an ordinary optical disc drive permits as a burst error.

In this way, on the optical disc of this embodiment, the recordable marks by the trial light emissions in synchronism with the data format of the concave and convex recording marks are formed in the specified region immediately before the recording region of the sub-information by the recordable marks. Therefore, the sub-information is stably recorded on the optical disc of this embodiment in synchronism with the concave and convex recording marks even in an ordinary optical disc drive.

Second Embodiment

Figure 4:
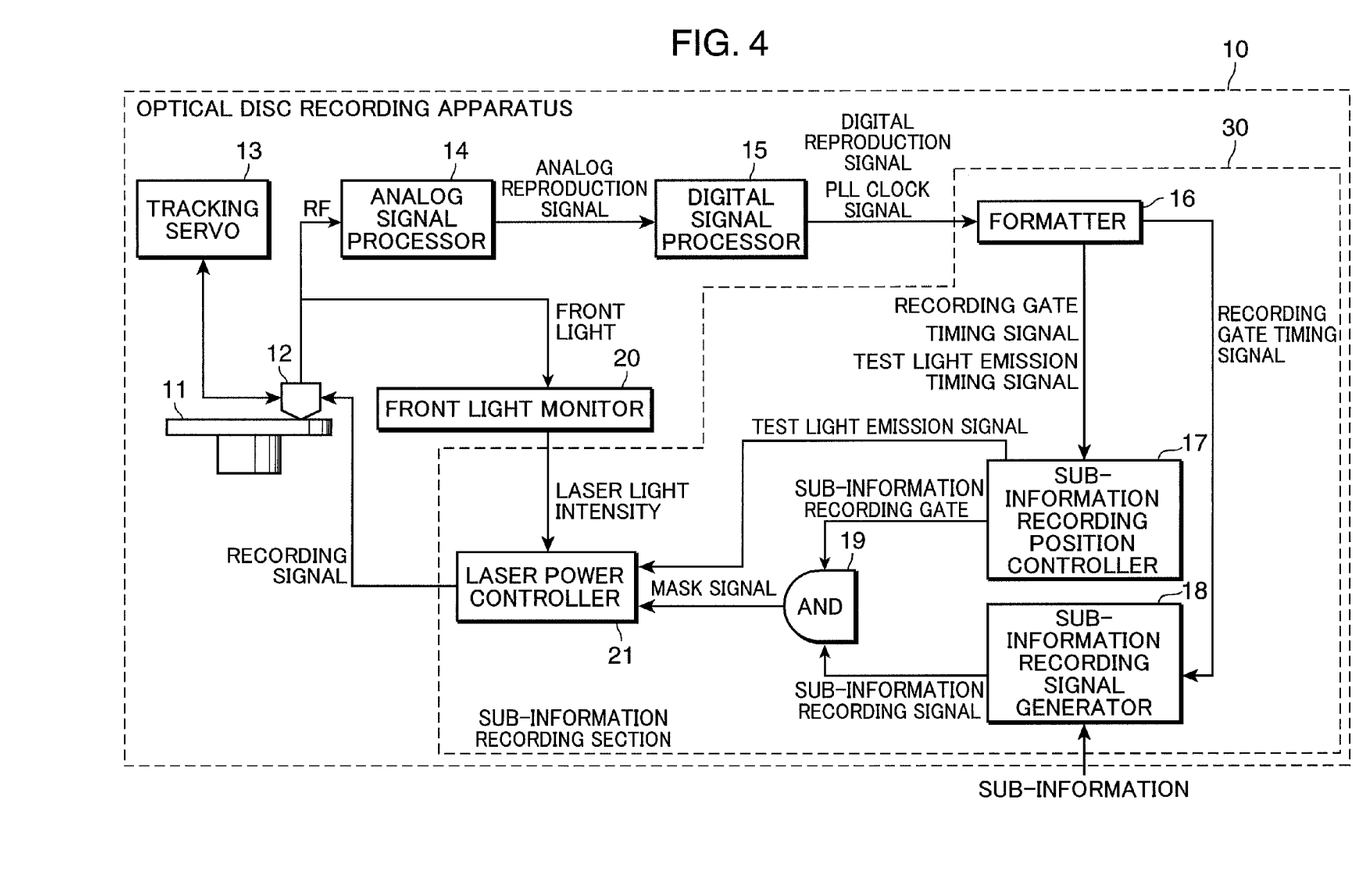
FIG. 4 is a block diagram showing a characteristic construction of an optical disc recording apparatus according to one embodiment.

In a second embodiment is described an optical disc recording apparatus according to one embodiment of the present invention. FIG. 4 is a block diagram showing a characteristic construction of the optical disc recording apparatus according to this embodiment.

An optical disc recording apparatus 10 is provided with an optical head 12, a tracking servo 13, an analog signal processor 14, a digital signal processor 15, a formatter 16, a sub-information recording position controller 17, a sub-information recording signal generator 18, an AND gate 19, a front light monitor 20 and a laser power controller 21. A sub-information recording section 30 includes the formatter 16, the sub-information recording position controller 17, the sub-information recording signal generator 18, the AND gate 19 and the laser power controller 21.

An optical disc 11 includes concave and convex recording marks formed along a spiral track based on main information and a reflective film which are formed on the concave and convex recording marks and whose reflectance changes upon laser light irradiation. The optical disc 11 shown in FIG. 4 has the same construction as the optical disc 1 in the first embodiment. The optical disc recording apparatus 10 records sub-information used to reproduce the main information on the optical disc 11.

The optical head 12 obtains an analog reproduction waveform according to reflected light intensity by irradiating laser light of reproduction-level laser power (first laser power) to the optical disc 11 and outputs it to the tracking servo 13, the analog signal processor 14 and the front light monitor 20. Further, the optical head 12 forms recordable marks on the reflective film by irradiating laser light of recording-level laser power (second laser power) to the optical disc 11.

The tracking servo 13 performs tracking to the spiral track of the concave and convex recording marks. The tracking servo 13 controls the optical head 12 in such a manner that a reproduction laser light spot from the optical head 12 is located in the center of the concave and convex recording mark by executing a tracking control to the spiral track in a circumferential direction formed by the concave and convex recording marks of the optical disc 11 based on the analog reproduction waveform from the optical head 12. The tracking servo 13 executes the tracking control to the concave and convex recording marks by a phase difference method utilizing a phase difference of reflected light from concave and convex recording mark edges.

The analog signal processor 14 extracts a reproduction signal (analog reproduction signal) corresponding to the concave and convex recording marks from the reflected light by irradiating the laser light of the reproduction-level laser power to the concave and convex recording marks. The analog signal processor 14 generates the analog reproduction signal by equalizing the analog reproduction waveform from the optical head 12 or extracting a frequency band of the concave and convex recording marks from the analog reproduction waveform, and outputs it to the digital signal processor 15.

The digital signal processor 15 extracts a channel clock synchronized with a channel bit length of the concave and convex recording marks from the reproduction signal extracted by the analog signal processor 14. The digital signal processor 15 binarizes the analog reproduction signal from the analog signal processor 14 and converts it into a digital reproduction signal. Further, the digital signal processor 15 generates a PLL clock signal synchronized with the concave and convex recording marks using a built-in PLL (Phase-Locked-Loop) circuit and outputs it to the formatter 16.

The sub-information recording section 30 records the sub-information by irradiating the laser light with the recording-level laser power based on the tracking to the spiral track by the tracking servo 13. Further, the sub-information recording section 30 records all the sub-information by repeating a process of recording a part of the sub-information by discretely irradiating laser light at a specified interval and with a specified frequency in synchronism with the channel clock extracted by the digital signal processor 15 by one tracking by the tracking servo 13 to thereby form recordable marks on the reflective film a plurality of times.

The sub-information recording section 30 also records one bit of the sub-information by at least one recordable mark. The sub-information recording section 30 forms the recordable mark by irradiating the laser light of the recording-level laser power in a different region in each tracking.

The formatter 16 includes a digital circuit which synchronizes with the input PLL clock signal, extracts the synchronization code assigned at each specified interval (frame) and extracts address information by dividing the digital reproduction signal into sections (sectors) each made up of a specified number of frames and assigned with an address. The formatter 16 separates the digital reproduction signal into error correction coded clusters each made up of a specified number of sectors, performs an error correction for each cluster and obtains main information such as content information recorded by the concave and convex recording marks. Further, the formatter 16 generates a recording gate indicating a region where the sub-information is to be recorded based on the address information obtained sector by sector. As shown in FIG. 2 of the first embodiment, the formatter 16 generates a gate signal indicating the entire cluster C1 as the recording gate. Further, the recording gate is output to the sub-information recording position controller 17 and the sub-information recording signal generator 18.

The formatter 16 generates a timing signal indicating a formation timing of the recordable mark and outputs it to the sub-information recording position controller 17 and the sub-information recording signal generator 18. Since the recordable mark is formed in a 128-channel bit section in the frame in this embodiment, the timing signal indicates the timing every 128 channel bits.

Further, the formatter 16 outputs a test light emission timing signal indicating a region where test light emissions are to be performed to the sub-information recording position controller 17. The test light emission timing signal is described in detail later.

Figure 5:
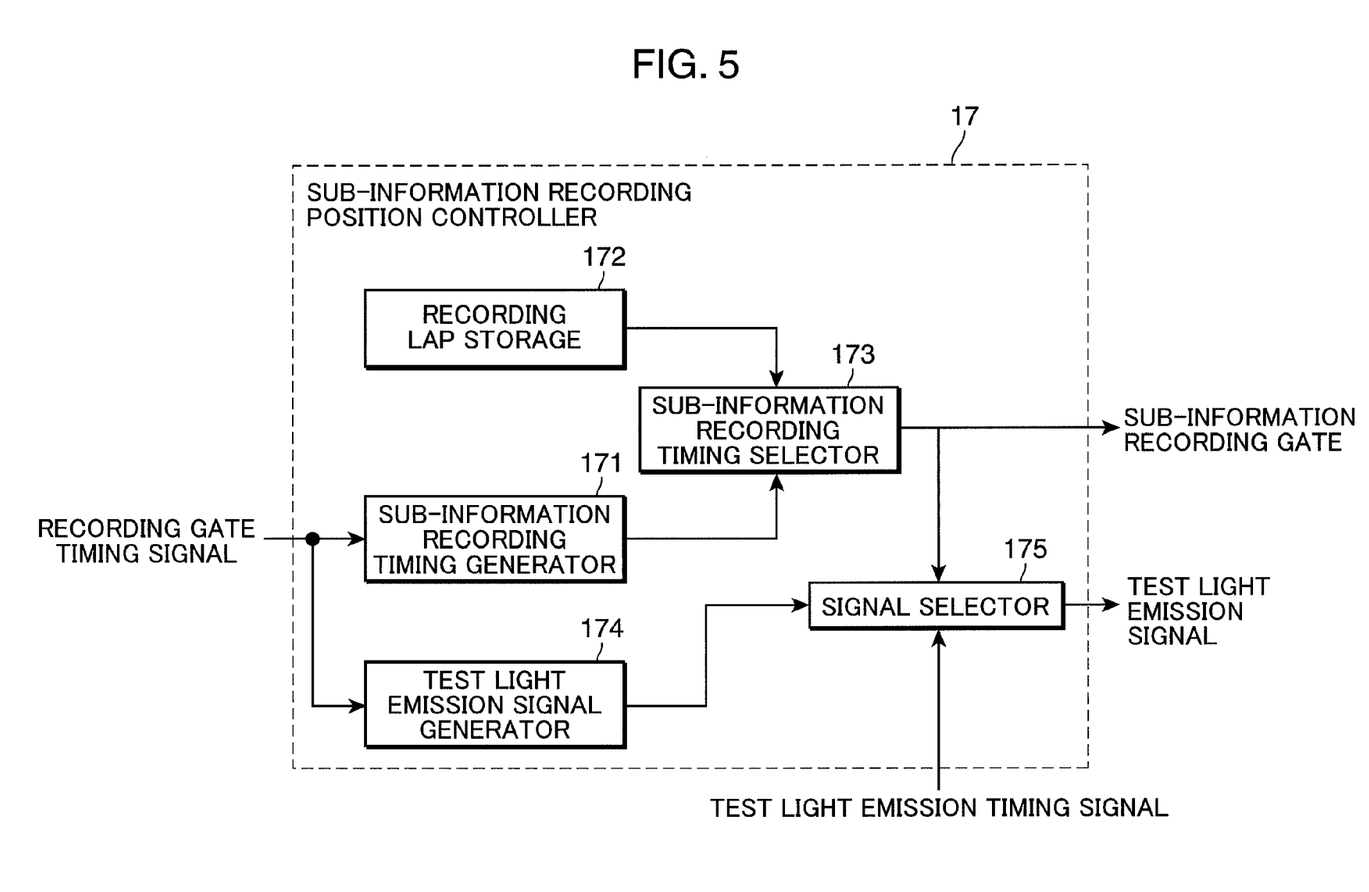
FIG. 5 is a block diagram showing a detailed construction of a sub-information recording position controller shown in FIG. 4.

The sub-information recording position controller 17 controls a position in the frame where the sub-information is to be recorded. A more detailed construction of the sub-information recording position controller 17 is shown in FIG. 5. FIG. 5 is a block diagram showing the detailed construction of the sub-information recording position controller 17 shown in FIG. 4.

The sub-information recording position controller 17 receives the recording gate, the timing signal and the test light emission timing signal from the formatter 16 and outputs a sub-information recording gate and a test light emission signal. The sub-information recording position controller 17 includes a sub-information recording light emission timing generator 171, a recording lap storage 172, a sub-information recording timing selector 173, a test light emission signal generator 174 and a signal selector 175.

The sub-information recording light emission timing generator 171 generates a recording timing for recording the sub-information in a section (sub-information recording position) where the recording gate from the formatter 16 is output. The sub-information recording timing is a recording light emission timing for recording one bit of the sub-information every 128 channel bits from the recording start position of the sub-information (leading end of the cluster C1 in this embodiment) as also described with reference to FIG. 2.

In this embodiment, 8 bits of the sub-information are recorded in one frame and one bit of the sub-information is recorded in each frame by one turn of tracking scan. Thus, the sub-information recording light emission timing generator 171 generates the first-turn to eighth-turn sub-information recording light emission gates corresponding to the first to eighth turns and adapted to set "H" every 128 channel bits in each frame, and outputs them to the sub-information recording timing selector 173. The first-turn sub-information recording light emission gate is a signal in which "H" is set in the first 128-channel bit section of each frame, and the eighth sub-information recording light emission gate is a signal in which "H" is set in the last 128-channel bit section of each frame. The first-turn to eighth-turn sub-information recording light emission gates are signals in which "H" is set in the respective 128-channel bit sections displaced from each other by 128 channel bits. The generated first-turn to eighth-turn sub-information recording light emission gates are output to the sub-information recording timing selector 173.

The recording lap storage 172 is a counter for rotation signals of an unillustrated spindle motor and counts revolutions of the optical disc upon being reset at the time of starting the recording of the sub-information. The recording lap storage 172 may also count the number of track jumps made to the sub-information recording track for recording the sub-information. In short, in the case of recording all the sub-information by a plurality of track scannings, the recording lap storage 172 counts the number of scannings made to the same track for recording the sub-information. Lap count information indicating the counted number of scannings made to the same track is output to the sub-information recording timing selector 173.

The sub-information recording timing selector 173 selects one of the eight sub-information recording light emission gates (first-turn sub-information recording light emission gate to eighth-turn sub-information recording light emission gate) generated by the sub-information recording light emission timing generator 171 based on the lap count information from the recording lap storage 172 and outputs it as the sub-information recording gate. In other words, the first-turn sub-information recording light emission gate is output as the sub-information recording gate if the lap count information indicates the first lap, and the eighth-turn sub-information recording light emission gate is output as the sub-information recording gate if the lap count information indicates the eighth lap.

The sub-information recording timing selector 173 outputs the auxiliary recording gate to the AND gate 19. The test light emission signal generator 174 and the signal selector 175 are described later.

The sub-information recording signal generator 18 generates a sub-information recording signal for recording the sub-information in accordance with the input sub-information. The generated sub-information recording signal is output to the AND gate 19. The externally input sub-information is recorded in synchronism with the frames as described above, wherein eight bits of the sub-information are recorded in each frame and one bit of the sub-information is recorded in each 128 channel-bit section. Thus, in the cluster for recording the sub-information (cluster C1 in this embodiment), bit0 to bit7 of the sub-information are recorded in the frame F0, bit8 to bit15 of the sub-information in the frame F2, . . . , and bit120 to bit127 of the sub-information are recorded in the frame F15.

The sub-information is recorded while being PE-modulated. Accordingly, the sub-information recording signal generator 18 generates a sub-information recording signal in which "H" is set in the first 64-channel bit section of the 128-channel bit section and "L" is set in the last 64-channel bit section in the case of recording "1" as the sub-information. Alternatively, the sub-information recording signal generator 18 generates a sub-information recording signal in which "L" is set in the first 64-channel bit section of the 128-channel bit section and "H" is set in the last 64-channel bit section in the case of recording "0" as the sub-information. The generated sub-information recording signal is output to the AND gate 19.

The AND gate 19 is a general AND gate and calculates the logical sum of the input sub-information recording gate and sub-information recording signal and outputs it as a mask signal to the laser power controller 21. As described above, the sub-information recording gate is a gate signal indicating at which position in the frame the sub-information is to be recorded in accordance with a track scanning number (number of revolutions of the optical disc) upon recording the sub-information. Accordingly, the logical sum of the sub-information recording gate and the sub-information recording signal is a signal indicating a laser light irradiation timing in the section where the sub-information is recorded according to the track scanning number (number of revolutions of the optical disc) upon recording the sub-information (first-turn and second-turn recording pulses 102, 104 of FIG. 2).

The front light monitor 20 measures the intensity of the laser light irradiated by the optical head 12.

The laser power controller 21 controls the optical head 12 to set a recording-level laser light intensity only when the input test light emission signal or sub-information recording signal is "H". Further, the laser power controller 21 counts the number of "H" sections in the test light emission signal and increases the laser light intensity every time the trial light emission is performed. Actually, the laser power controller 21 reads the laser light intensities from the front light monitor 20 and searches for an optimal laser light intensity for recording the sub-information in a plurality of trial light emissions. The laser power controller 21 sets the searched optimal laser light intensity for the recording of the sub-information immediately before the sub-information is recorded (immediately before timing t1 of FIG. 2).

Thus, even if the laser light intensity somewhat changes due to a temperature change or the like, the optimal laser light intensity can be searched and set in the cluster immediately before the one for recording the sub-information by performing the trial light emissions while changing the laser light intensity. Therefore, the sub-information can be constantly recorded with the optimal laser light intensity. Hence, problems that the sub-information cannot be stably recorded due to a small laser light intensity or the reflective film of the optical disc is scratched due to an excessive laser light intensity upon recording the sub-information can be prevented. The laser power controller 21 generates the recording signal indicating the irradiation timings of the laser light of the recording level for the trial light emissions and the recording of the sub-information and the laser light intensity at the time of performing the trial laser light emission and recording the sub-information and outputs it to the optical head 12.

The optical head 12 switches the laser light intensity between the reproduction-level laser light intensity and the recording-level laser light intensity based on the recording signal from the laser power controller 21 and records the sub-information on the concave and convex recording marks.

In this embodiment, the optical head 12 corresponds to an example of an optical head, the tracking servo to an example of a tracking section, the analog signal processor 14 to an example of a reproduction signal extracting section, the digital signal processor 15 to an example of a clock extracting section and the sub-information recording section to an example of a sub-information recording section.

As described above, if the optical disc recording apparatus of this embodiment is used, the recordable marks can be formed by changing the reflectance of the recording film and the sub-information can be recorded by irradiating recording-level laser light having a specified intensity or higher to the optical disc having the recording film, whose reflectance changes upon laser light irradiation, formed on the concave and convex recording marks. However, normally, the tracking control to the concave and convex recording mark track and the reproducing operation of the concave and convex recording marks become unstable and the sub-information cannot be recorded in synchronism with the recording format of the concave and convex recording marks if the laser light of the recording level is irradiated.

Accordingly, all the sub-information can be recorded by partially recording the sub-information by one tracking scan and repeating the tracking scan a plurality of times using the optical disc recording apparatus of this embodiment. A general optical disc recording apparatus is designed, assuming burst errors of optical discs. Thus, if laser light of the recording level is irradiated in a burst-error permissible range, there is no interference with the tracking scan to the concave and convex recording marks and the reproducing operation of the concave and convex recording marks.

In the case of recording the sub-information by irradiating recording-level laser light onto the concave and convex recording marks and changing the reflectance of the reflective film, the reproduction reliability of the concave and convex recording marks deteriorates if the laser light intensity is excessively high. Conversely, if the laser light intensity is excessively weak, the reproduction reliability of the concave and convex recording marks deteriorates. Thus, the laser light intensity for recording the sub-information needs to be strictly adjusted. However, the laser light intensity normally changes due to a temperature characteristic or the like. Accordingly, in the optical disc recording apparatus of this embodiment, the trial light emissions are performed while the laser light intensity is changed stepwise immediately before the sub-information is recorded, and these laser light intensities are measured to set the laser light intensity for recording the sub-information. In this way, even upon a temperature change, an optimal laser light intensity for recording the sub-information can be set and the sub-information can be recorded.

Next, the trial light emission (test light emission) operation for recording the sub-information in this embodiment is described.

As described above, the main information is recorded by forming the concave and convex recording marks transferred from the master in this embodiment. Further, after the optical disc in which the reflective film whose reflectance changes upon the irradiation of recording laser light is deposited on the concave and convex recording marks is formed, recording-level laser light is irradiated while the tracking control is performed to the concave and convex recording marks, thereby forming the recordable marks on the concave and convex recording marks to record the sub-information.

However, a laser of the optical head is normally current-driven, but a current value for the drive and the laser light intensity of laser light actually irradiated may possibly vary due to a temperature characteristic and from laser to laser. In order to stably form the recordable marks, the laser light intensity for stably forming the recordable marks needs to be measured by performing laser light emissions at various set current values in a region before the one where the sub-information is to be recorded and monitoring these laser light intensities using the front light motor or the like.

FIG. 2 described above shows the timing chart in the case where the sub-information is recorded in the cluster C1 from timing t1 on in this embodiment. Thus, the trial light emissions are performed in the region before timing t1. In this embodiment is described the mode of performing the trial light emissions using the cluster C0 immediately before the cluster C1 adjacent in the tracking direction as the region before timing t1.

Figure 6:
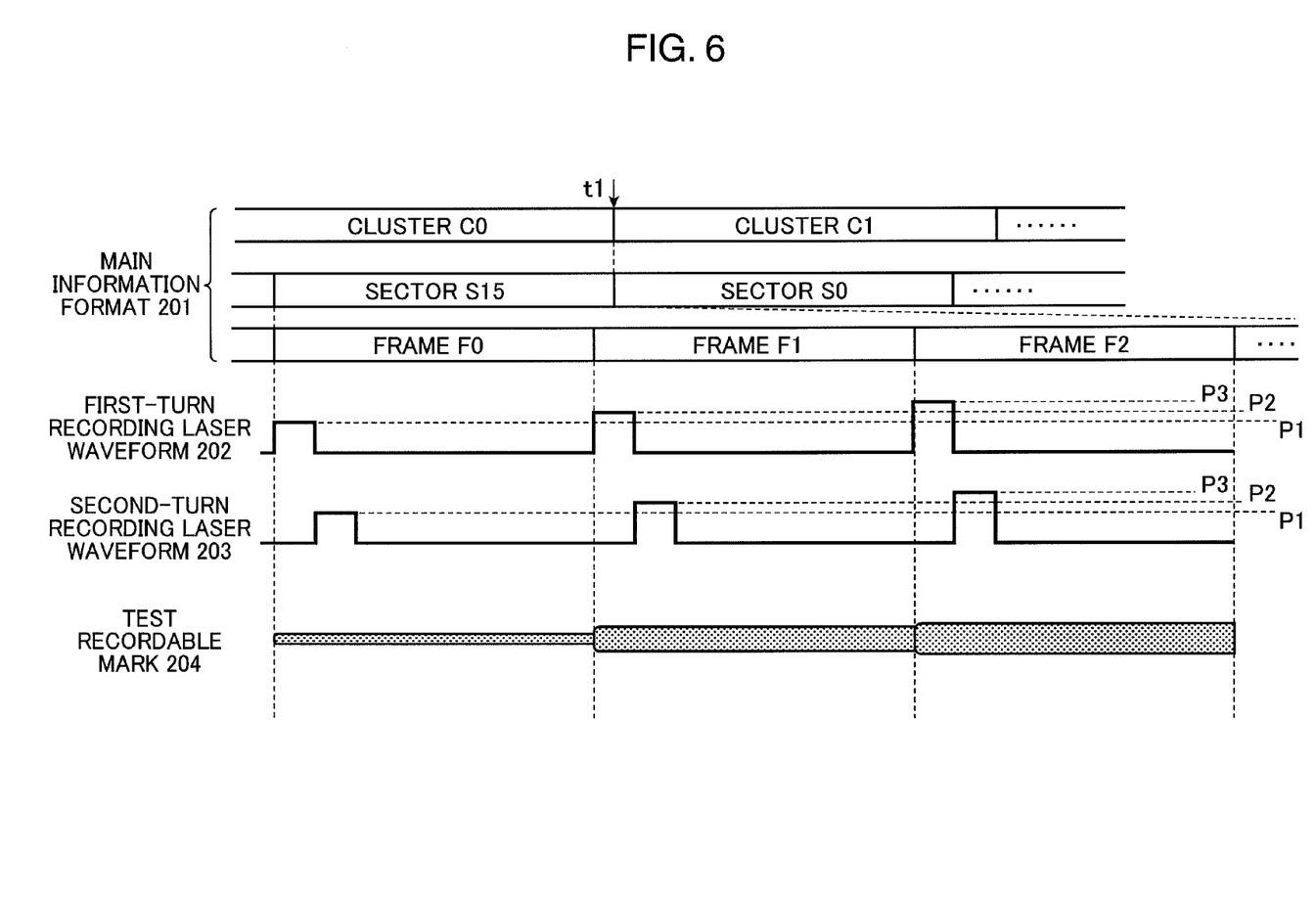
FIG. 6 is a timing chart showing an example of a test light emission operation in the embodiment.

FIG. 6 is a timing chart showing an example of a test light emission operation in this embodiment. A main information format 201 of FIG. 6 indicates a data format of the main information to be recorded by the concave and convex recording marks similar to the main information format of FIG. 2. The main information on the optical disc of this embodiment is recorded by the error correction coded cluster as the minimum unit of logical reading. The cluster is made up of a plurality of sectors, to each of which address information is assigned, and the sector is made up of a plurality of frames as the minimum units accompanied by synchronization codes.

As described above, the sub-information of this embodiment is recorded in synchronism with the main information format 201. In this embodiment, the sub-information is recorded in the cluster C1 from timing t1 on and the test light emissions are performed in the cluster C0 immediately before the cluster C1. A recording laser waveform 202 of FIG. 6 indicates a test light emission pulse upon performing the test light emission in a test light emission region, i.e. in the cluster C0.

According to a sub-information recording method in this embodiment, in order to enable a stable control of a tracking servo even if recording laser light is irradiated, tracking is performed to the same track a plurality of times by irradiating the recording laser light once for each frame, whereby the sub-information is continuously recorded on the track extending in the circumferential direction. Similarly, the test light emission is performed for each of a plurality of tracking controls for the same track in the cluster C0. Thus, the recording laser waveform 202 of FIG. 6 indicates a test light emission pattern in the first-turn tracking operation, and a recording laser waveform 203 of FIG. 6 indicates a test light emission pattern in the second-turn tracking operation.

As at the time of recording the sub-information, this test light emission is performed by irradiating the recording laser light once in each frame and the actual laser light intensity during this laser light irradiation is observed using the front light monitor 20 or the like. In this embodiment, laser light is emitted at different light emission intensities for the respective frames and the optimal laser light intensity for recording the sub-information is selected. In the recording laser waveforms 202, 203 of FIG. 6, the test light emission is performed at the laser light intensity of level P1 in the frame F0, at the laser light intensity of level P2 higher than level P1 in the frame F1 and at the laser light intensity of level P3 higher than level P2 in the frame F2. Further, at the time of the test light emissions, the laser light is irradiated while a test light emission region in the frame is changed for each of the plurality of tracking controls.

Since the test light emissions are performed for the purpose of measuring the laser light intensities, they may be performed in the same region in the frames in each of the plurality of tracking controls. However, the test light emission regions are preferably changed for each tracking control in order to prevent the deterioration of the reflective film caused by repeatedly irradiating the laser light of the recording intensity to the same regions. There is no problem in the operation of the system even if the reflective film is deteriorated in regions where the concave and convex recording marks are meaningless such as control regions in inner and outer circumferential parts of the optical disc. In such a case, the test light emissions may be performed in the same regions of the frames.

A test recordable mark 204 of FIG. 6 indicates a recordable mark formed in a test light emission section. In this embodiment, the test light emissions are performed while the recording power is changed to level P1, level P2 or level P3 in each frame. Thus, in the test light emission region, recording marks whose lengths (thicknesses) in a radial direction of the optical disc according to the recording laser light intensity and whose reflected light intensities (reflectances) differ in response to recording-power laser light are continuously formed.

Next, the construction of the optical disc recording apparatus of this embodiment for performing the test light emission operation is described with reference to FIGS. 4 and 5.

In a section where the test light emissions are performed (cluster C0 in this embodiment), the formatter 16 generates a test light emission timing signal. The formatter 16 decodes the address information assigned to each sector from a digital reproduction signal indicating the main information and identifies the test light emission section based on this address information. A test light emission timing signal is a signal indicating a region in each frame where the test light emission is performed in each tracking in a plurality of tracking controls to the same track. Accordingly, the test light emission timing signal is a signal generated by changing the position in the frame for each tracking operation of the same lap. The test light emission timing signal is output to the sub-information recording position controller 17.

The formatter 16 generates a recording gate indicating a recording laser waveform in the entire region (cluster C0) where the test light emissions are performed based on the address information obtained by the sector. The recording gate is output to the sub-information recording position controller 17.

The sub-information recording position controller 17 generates a test light emission signal in which a test light emission position in the frame is changed for each tracking control of the same lap. The sub-information recording position controller 17 receives the recording gate for the test light emissions and the test light emission timing signal indicating the laser light irradiation section of the test light emissions from the formatter 16 and generates the test light emission signal.

In FIG. 5, the test light emission signal generator 174 generates test light emission signals of all the patterns in the test light emission section based on the recording gate from the formatter 16. In other words, the test light emission signal generator 174 generates test light emission signals (e.g.

recording laser waveforms 202, 203 of FIG. 6) in the respective first to n-th trackings, and outputs them to the signal selector 175.

The signal selector 175 includes an AND gate and an OR gate and receives the test light emission timing signal indicating the test light emission positions corresponding to the number of trackings from the formatter 16 and the first to n-th test light emission signals from the test light emission signal generator 174. The signal selector 175 performs an AND operation of the first to n-th test light emission signals and the test light emission timing signal and an OR operation of n signals as a result of the AND operation to generate the test light emission signals corresponding to the number of trackings, and outputs them to the laser power controller 21. In other words, only the test light emission signals corresponding to the number of accesses made to the same track are extracted by the AND operation, and the other signals are masked by the test light emission timing signal, whereby the OR operation of the n signals is performed. In this way, the test light emission signals corresponding to the number of accesses can be generated.

The signal selector 175 may use the sub-information recording gate from the sub-information recording timing selector 173 instead of the test light emission timing signal in order to relate the laser irradiation positions in the frames for recording the sub-information in the cluster C1 to the test light emission positions. In this case, the recording laser light irradiation positions for forming the recordable marks of the sub-information and the recording laser light irradiation positions for the test light emissions are set at the same positions in the frames of the clusters C0 and C1.

The laser power controller 21 causes the irradiation of laser light at different intensities for the respective frames based on the test light emission signals.

The front light monitor 20 measures the actual intensities of the irradiated laser light and outputs them to the laser power controller 21. The laser power controller 21 selects an optimal laser light intensity for recording the sub-information out of a plurality of laser light intensities and sets the selected laser light intensity before timing t1. In this way, the sub-information is recorded at the set optimal laser light intensity for recording the sub-information in the cluster C1 after timing t1.

As described above, in the optical disc recording apparatus of this embodiment, the sub-information can be recorded after the test light emissions are performed in the region immediately before the region where the sub-information is to be recorded and the optimal laser light intensity is set. Normally, if the laser light intensity for recording the sub-information is excessively weak, no recordable mark can be formed or the sub-information of such a level that cannot be stably read is recorded. On the other hand, if the laser light intensity is excessively strong, there are problems that the reflective film itself is deteriorated and the recordable marks indicating the sub-information can be visually confirmed to increase a risk of being easily decrypted by a malicious person. However, if the optimal laser light intensity is set after the test light emissions are performed as in this embodiment, a risk of these problems is reduced and copyright protection using the sub-information becomes possible.

In the optical disc of this embodiment, the test light emission region is provided in the region (cluster C0) different from the one (cluster C1) where the sub-information is to be recorded. Since laser light is irradiated to measure the laser light intensities in the test light emission region, the recordable marks different from those indicating the sub-information are formed. The recordable marks in the test light emission region are recording marks formed by irradiating the light of different intensities, and the widths of the recordable marks in the disc radial direction increase as the recording laser light intensity is increased.

Although the laser light intensity for recording the sub-information is adjusted by performing the trial light emissions before the sub-information is recorded in this embodiment, the present invention is not particularly limited thereto and no trail light emission may be performed if the laser light intensity does not change or if there is no influence on the recording and reproduction of the sub-information even if the laser light intensity is changed.

In this embodiment, the tracking servo 13, the analog signal processor 14, the digital signal processor 15, the formatter 16, the sub-information recording position controller 17, the sub-information recording signal generator 18, the AND gate 19 and the laser power controller 21 may be formed by an integrated circuit such as an LSI.

The above specific embodiments mainly embrace inventions having the following constructions.

An optical disc recording apparatus according to one aspect of the present invention is for recording sub-information used to reproduce main information on an optical disc including concave and convex marks formed along a spiral track based on the main information and a reflective film which is formed on the concave and convex marks and whose reflectance changes upon laser light irradiation and comprises an optical head for irradiating laser light to the optical disc; a tracking section for tracking the spiral track of the concave and convex marks; a reproduction signal extracting section for irradiating laser light with a first laser power to the concave and convex marks to thereby extract a reproduction signal corresponding to the concave and convex marks from reflected light; a clock extracting section for extracting a channel clock synchronized with a channel bit length of the concave and convex marks from the reproduction signal extracted by the reproduction signal extracting section; and a sub-information recording section for recording the sub-information by irradiating laser light with a second laser power different from the first laser power based on the tracking to the spiral track by the tracking section, wherein the sub-information recording section repeats a process of recording a part of the sub-information by discretely irradiating the laser light of the second laser power at a specified interval and with a specified frequency in synchronism with the channel clock extracted by the clock extracting section by one tracking by the tracking section to form recordable marks on the reflective film a plurality of times, thereby recording all the sub-information.

According to this construction, the laser light is irradiated to the optical disc including the concave and convex marks formed along the spiral track based on the main information and the reflective film which is formed on the concave and convex marks and whose reflectance changes upon the laser light irradiation. The spiral track of the concave and convex marks is tracked and the laser light is irradiated with the first laser power to the concave and convex marks, whereby the reproduction signal corresponding to the concave and convex marks is extracted from the reflected light. The channel clock synchronized with the channel bit length of the concave and convex marks is extracted from the extracted reproduction signal, and the sub-information is recorded by the irradiation of the laser light with the second laser power different from the first laser power based on the tracking to the spiral track. In one tracking, the laser light of the second laser power is discretely irradiated at the specified interval and with the specified frequency in synchronism with the extracted channel clock to form the recordable mark on the reflective film, whereby a part of the sub-information is recorded. By repeating the process of recording a part of the sub-information by one tracking a plurality of times, all the sub-information is recorded.

Accordingly, all the sub-information is not recorded by one tracking, but all the sub-information is recorded by repeating the process of recording a part of the sub-information by discretely irradiating the laser light of the second laser power by one tracking a plurality of times. Thus, even if the recordable marks are formed with the second laser power while the concave and convex marks are reproduced with the first laser power, a tracking control to the concave and convex marks can be stably executed and the sub-information can be stably recorded.

In the above optical disc recording apparatus, the specified interval is preferably equal to or shorter than a burst error length to permit the reproduction of the main information recorded by the concave and convex marks of the optical disc.

According to this construction, since the specified interval is equal to or shorter than the burst error length to permit the reproduction of the main information recorded by the concave and convex marks of the optical disc, the recordable marks can be processed as burst errors and the tracking control to the concave and convex marks can be stably executed.

In the above optical disc recording apparatus, it is preferable that the main information is composed of a plurality of frames; and that an equation of $Lw=Lf/(2\times M)$ (where M is a natural number) is satisfied when Lf denotes the length of the frames and Lw denotes the specified interval.

According to this construction, the specified interval Lw satisfies the equation of $Lw=Lf/(2\times M)$ (where M is a natural number), the specified interval can be determined based on the length of the frames and the tracking control to the concave and convex marks can be stably executed.

In the above optical disc recording apparatus, the specified frequency is preferably equal to or lower than a burst error frequency to permit the reproduction of the main information recorded by the concave and convex marks of the optical disc.

According to this construction, since the specified frequency is equal to or shorter than the burst error frequency to permit the reproduction of the main information recorded by the concave and convex marks of the optical disc, the recordable marks can be processed as burst errors and the tracking control to the concave and convex marks can be stably executed.

In the above optical disc recording apparatus, it is preferable that the main information is composed of a plurality of frames; and that the specified frequency is a frequency synchronized with the frames. According to this construction, since the recordable marks are formed at the frequency synchronized with the frames, the recordable marks can be formed while the concave and convex marks are reproduced.

In the above optical disc recording apparatus, the second laser power is preferably higher than the first laser power. According to this construction, since the second laser power is higher than the first laser power, it is possible to reproduce the concave and convex marks with the first laser power and form the recordable marks with the second laser power.

In the above optical disc recording apparatus, the sub-information recording section preferably records one bit of the sub-information by at least one of the recordable marks. According to this construction, one bit of the sub-information can be recorded by at least one of the recordable marks.

In the above optical disc recording apparatus, the sub-information recording section preferably forms the recordable marks by irradiating the laser light of the second laser power in a different region in each tracking.

According to this construction, since the recordable marks are formed by irradiating the laser light of the second laser power in the different region in each tracking, the laser light is irradiated not in the same region, but in different regions in the respective trackings. Thus, the sub-information can be recorded over a plurality of times.

In the above optical disc recording apparatus, the specified interval is preferably equal to or shorter than $T\times Tp/2\pi S$ when T, Tp and S denote a rotation period of the optical disc in a circumferential direction, a track pitch and a maximum eccentricity.

According to this construction, even if no tracking error signal of a phase difference method can be sampled by irradiating the laser light of the second laser power, there is no likelihood of erroneously crossing a track of the optical disc having the tracking pitch Tp with the maximum eccentricity S, wherefore the sub-information can be stably recorded.

In the above optical disc recording apparatus, it is preferable that the main information is composed of a plurality of frames; and that the specified interval is equal to or shorter than one frame. According to this construction, since the recordable marks are formed at intervals equal to or shorter than one frame, it is possible to form the recordable marks while the concave and convex marks are reproduced.

An optical disc according to another aspect of the present invention comprises concave and convex marks formed in synchronism with an integral multiple of a channel bit length based on main information; and a reflective film which is formed on the concave and convex marks and whose reflectance changes upon laser light irradiation, wherein a process of discretely irradiating laser light at a specified interval and with a specified frequency in synchronism with the integral multiple of the channel bit length by one tracking based on a spiral track of the concave and convex marks formed in a circumferential direction is repeated a plurality of times, thereby forming recordable marks for recording sub-information used to reproduce the main information on the reflective film.

According to this construction, the optical disc comprises the concave and convex marks formed in synchronism with the integral multiple of the channel bit length based on the main information and the reflective film which is formed on the concave and convex marks and whose reflectance changes upon the laser light irradiation. The laser light is discretely irradiated at the specified interval and with the specified frequency in synchronism with the integral multiple of the channel bit length by one tracking based on a spiral track of the concave and convex marks formed in a circumferential direction. By repeating the process of discretely irradiating the laser light by one tracking a plurality of times, a recordable mark string for recording the sub-information used to reproduce the main information is formed on the reflective film.

Thus, all the sub-information is not recorded by one tracking, but all the sub-information is recorded by repeating the process of recording a part of the sub-information by discretely irradiating the laser light by one tracking a plurality of times. Thus, even if the recordable marks are formed while the concave and convex marks are reproduced, a tracking control to the concave and convex marks can be stably executed and the sub-information can be stably recorded.

An optical disc recording circuit according to another aspect of the present invention is for recording sub-information used to reproduce main information on an optical disc including concave and convex marks formed along a spiral track based on the main information and a reflective film which is formed on the concave and convex marks and whose reflectance changes upon laser light irradiation and comprises a tracking section for tracking the spiral track of the concave and convex marks; a reproduction signal extracting section for irradiating laser light with a first laser power to the concave and convex marks to thereby extract a reproduction signal corresponding to the concave and convex marks from reflected light, a clock extracting section for extracting a channel clock synchronized with a channel bit length of the concave and convex marks from the reproduction signal extracted by the reproduction signal extracting section; and a sub-information recording section for recording the sub-information by irradiating laser light with a second laser power different from the first laser power based on the tracking to the spiral track by the tracking section, wherein the sub-information recording section repeats a process of recording a part of the sub-information by discretely irradiating the laser light of the second laser power at a specified interval and with a specified frequency in synchronism with the channel clock extracted by the clock extracting section by each tracking by the tracking section to form recordable marks on the reflective film a plurality of times, thereby recording all the sub-information.

According to this construction, the laser light is irradiated to the optical disc including the concave and convex marks formed along the spiral track based on the main information and the reflective film which is formed on the concave and convex marks and whose reflectance changes upon the laser light irradiation. The spiral track of the concave and convex marks is tracked and the laser light is irradiated with the first laser power to the concave and convex marks, whereby the reproduction signal corresponding to the concave and convex marks is extracted from the reflected light. The channel clock synchronized with the channel bit length of the concave and convex marks is extracted from the extracted reproduction signal, and the sub-information is recorded by the irradiation of the laser light with the second laser power different from the first laser power based on the tracking to the spiral track. In each tracking, the laser light of the second laser power is discretely irradiated at the specified interval and with the specified frequency in synchronism with the extracted channel clock to form the recordable mark on the reflective film, whereby a part of the sub-information is recorded. By repeating the process of recording a part of the sub-information by one tracking a plurality of times, all the sub-information is recorded.

Accordingly, all the sub-information is not recorded by one tracking, but all the sub-information is recorded by repeating the process of recording a part of the sub-information by discretely irradiating the laser light of the second laser power by one tracking a plurality of times. Thus, even if the recordable marks are formed with the second laser power while the concave and convex marks are reproduced with the first laser power, a tracking control to the concave and convex marks can be stably executed and the sub-information can be stably recorded.

The specific embodiments or examples described in the detailed description of the invention are to elucidate the technical contents of the present invention, and the present invention should not be narrowly interpreted while being limited only to such specific examples. Various changes can be made within the spirit of the present invention and the scope thereof as claimed.

INDUSTRIAL APPLICABILITY

As described above, if the present invention is utilized, it is possible not only to record sub-information unique to each optical disc, but also to prevent the sub-information of the optical disc from being fraudulently copied to other optical discs even if the optical discs are reproduction-only optical discs. This prevents the copyright of content data recorded on the optical discs from being illegally infringed and enables the provision of an optical disc recording apparatus, an optical disc recording circuit and an optical disc which can be applied to a copyright management system for content data necessary for the management for each optical disc and acquired via a network.

What is claimed is:

1. An optical disc recording apparatus for recording sub-information used to reproduce main information on an optical disc including concave and convex marks formed along a spiral track based on the main information and a reflective film which is formed on the concave and convex marks and whose reflectance changes upon laser light irradiation, comprising:
   an optical head for irradiating laser light to the optical disc;
   a tracking section for tracking the spiral track of the concave and convex marks;
   a reproduction signal extracting section for irradiating laser light with a first laser power to the concave and convex marks to thereby extract a reproduction signal corresponding to the concave and convex marks from reflected light;
   a clock extracting section for extracting a channel clock synchronized with a channel bit length of the concave and convex marks from the reproduction signal extracted by the reproduction signal extracting section; and
   a sub-information recording section for recording the sub-information by irradiating laser light with a second laser power different from the first laser power based on the tracking to the spiral track by the tracking section,
   wherein:
   the sub-information recording section records the sub-information by discretely irradiating the laser light of the second laser power at a specified interval and with a specified frequency in synchronism with the channel clock extracted by the clock extracting section by one tracking by the tracking section to form recordable marks on the reflective film;
   the specified interval is equal to or shorter than a burst error length to permit the reproduction of the main information recorded by the concave and convex marks of the optical disc;
   the specified frequency is equal to or lower than a burst error frequency to permit the reproduction of the main information recorded by the concave and convex marks of the optical disc;
   the main information is composed of a plurality of frames accompanied by synchronization codes; and
   an equation of $Lw=Lf/(2\times M)$ (where M is a natural number) is satisfied when Lf denotes the length of the frames and Lw denotes the specified interval.

2. An optical disc recording apparatus according to claim 1, wherein:
   the main information is composed of a plurality of frames accompanied by synchronization codes; and
   the specified frequency is a frequency synchronized with the frames.

3. An optical disc recording apparatus according to claim 2, wherein the specified frequency is a frequency of forming at least one recordable mark in the frame.

4. An optical disc recording apparatus according to claim 1, wherein the sub-information recording section records one bit of the sub-information by at least one of the recordable marks.

5. An optical disc recording apparatus for recording sub-information used to reproduce main information on an optical disc including concave and convex marks formed along a spiral track based on the main information and a reflective film which is formed on the concave and convex marks and whose reflectance changes upon laser light irradiation, comprising:
an optical head for irradiating laser light to the optical disc;
a tracking section for tracking the spiral track of the concave and convex marks;
a reproduction signal extracting section for irradiating laser light with a first laser power to the concave and convex marks to thereby extract a reproduction signal corresponding to the concave and convex marks from reflected light;
a clock extracting section for extracting a channel clock synchronized with a channel bit length of the concave and convex marks from the reproduction signal extracted by the reproduction signal extracting section; and
a sub-information recording section for recording the sub-information by irradiating laser light with a second laser power different from the first laser power based on the tracking to the spiral track by the tracking section,
wherein:
the sub-information recording section records the sub-information by discretely irradiating the laser light of the second laser power at a specified interval and with a specified frequency in synchronism with the channel clock extracted by the clock extracting section by one tracking by the tracking section to form recordable marks on the reflective film;
the specified interval is equal to or shorter than a burst error length to permit the reproduction of the main information recorded by the concave and convex marks of the optical disc;
the specified frequency is equal to or lower than a burst error frequency to permit the reproduction of the main information recorded by the concave and convex marks of the optical disc; and
the specified interval is equal to or shorter than $T \times Tp/2\pi S$ when T, Tp and S denote a rotation period of the optical disc in a circumferential direction, a track pitch and a maximum eccentricity.

6. An optical disc recording apparatus according to claim 5, wherein:
the main information is composed of a plurality of frames; and
the specified interval is equal to or shorter than one frame.

7. An optical disc, comprising:
concave and convex marks formed in synchronism with an integral multiple of a channel bit length based on main information; and
a reflective film which is formed on the concave and convex marks and whose reflectance changes upon laser light irradiation,
wherein laser light is discretely irradiated at a specified interval and with a specified frequency in synchronism with the integral multiple of the channel bit length by one tracking based on a spiral track of the concave and convex marks formed in a circumferential direction, thereby forming a recordable mark string for recording sub-information used to reproduce the main information on the reflective film,
the specified interval is equal to or shorter than a burst error length to permit the reproduction of the main information recorded by the concave and convex marks of the optical disc;
the specified frequency is equal to or lower than a burst error frequency to permit the reproduction of the main information recorded by the concave and convex marks of the optical disc;
the main information is composed of a plurality of frames accompanied by synchronization codes; and
an equation of $Lw=Lf/(2 \times M)$ (where M is a natural number) is satisfied when Lf denotes the length of the frames and Lw denotes the specified interval.

8. An optical disc recording circuit for recording sub-information used to reproduce main information on an optical disc including concave and convex marks formed along a spiral track based on the main information and a reflective film which is formed on the concave and convex marks and whose reflectance changes upon laser light irradiation, comprising:
a tracking controlling section for tracking the spiral track of the concave and convex marks;
a reproduction signal processing section for irradiating laser light with a first laser power to the concave and convex marks to thereby process a reproduction signal corresponding to the concave and convex marks from reflected light;
a clock extracting section for extracting a channel clock synchronized with a channel bit length of the concave and convex marks from the reproduction signal processed by the reproduction signal processing section; and
a sub-information recording section for generating a sub-information recording signal used to record the sub-information by irradiating laser light with a second laser power different from the first laser power based on the tracking to the spiral track by the tracking controlling section,
wherein:
the sub-information recording section records the sub-information by discretely irradiating the laser light of the second laser power at a specified interval and with a specified frequency in synchronism with the channel clock extracted by the clock extracting section by one tracking by the tracking controlling section to form recordable marks on the reflective film,
the specified interval is equal to or shorter than a burst error length to permit the reproduction of the main information recorded by the concave and convex marks of the optical disc;
the specified frequency is equal to or lower than a burst error frequency to permit the reproduction of the main information recorded by the concave and convex marks of the optical disc;
the main information is composed of a plurality of frames accompanied by synchronization codes; and
an equation of $Lw=Lf/(2 \times M)$ (where M is a natural number) is satisfied when Lf denotes the length of the frames and Lw denotes the specified interval.

* * * * *